April 5, 1938.  N. T. DIETRICH  2,113,399
AUTOMOBILE FRAME
Filed Jan. 22, 1936  2 Sheets-Sheet 2
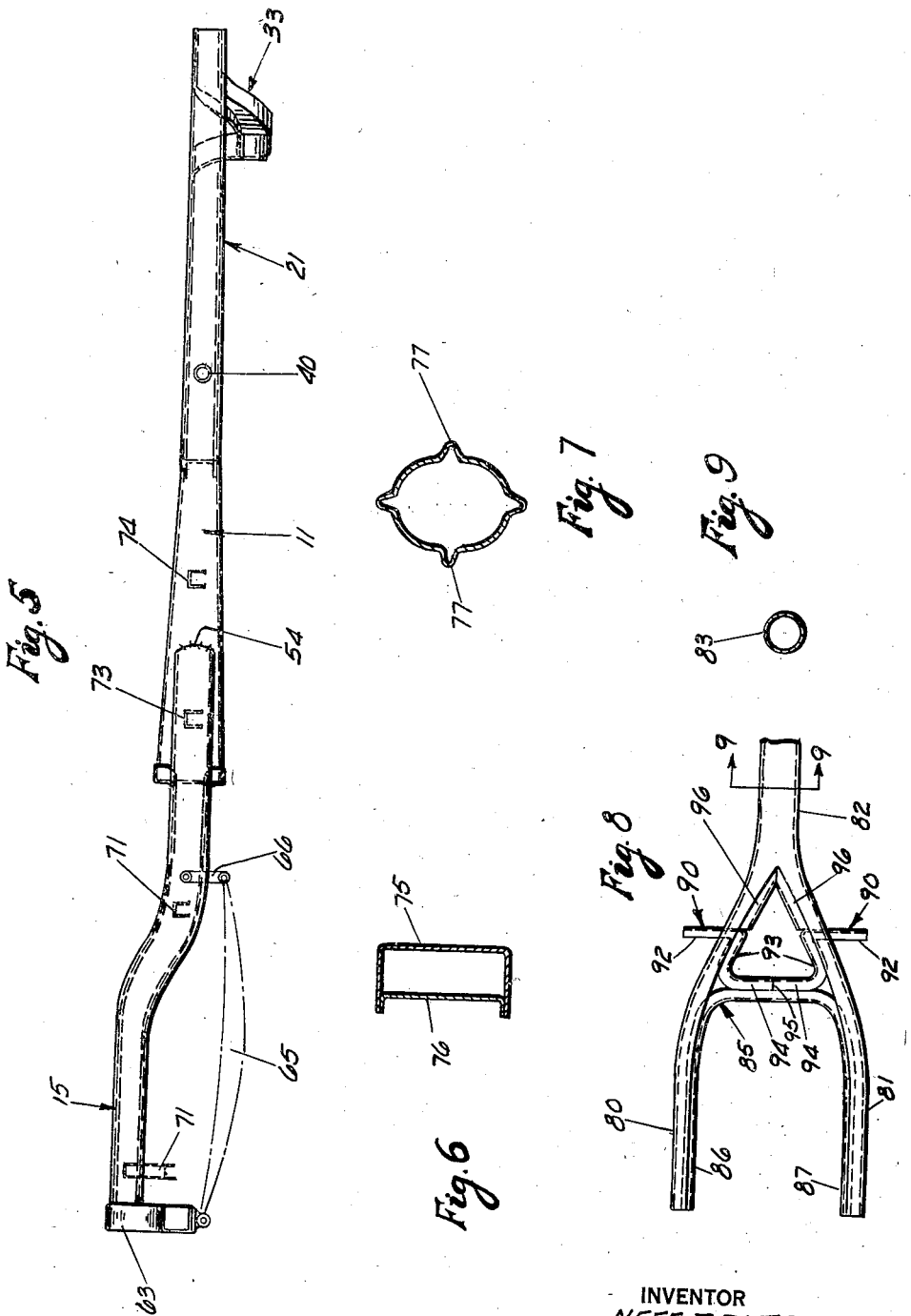
INVENTOR
NEFF T. DIETRICH
BY Louis W. Helmuth
ATTORNEY Patented Apr. 5, 1938

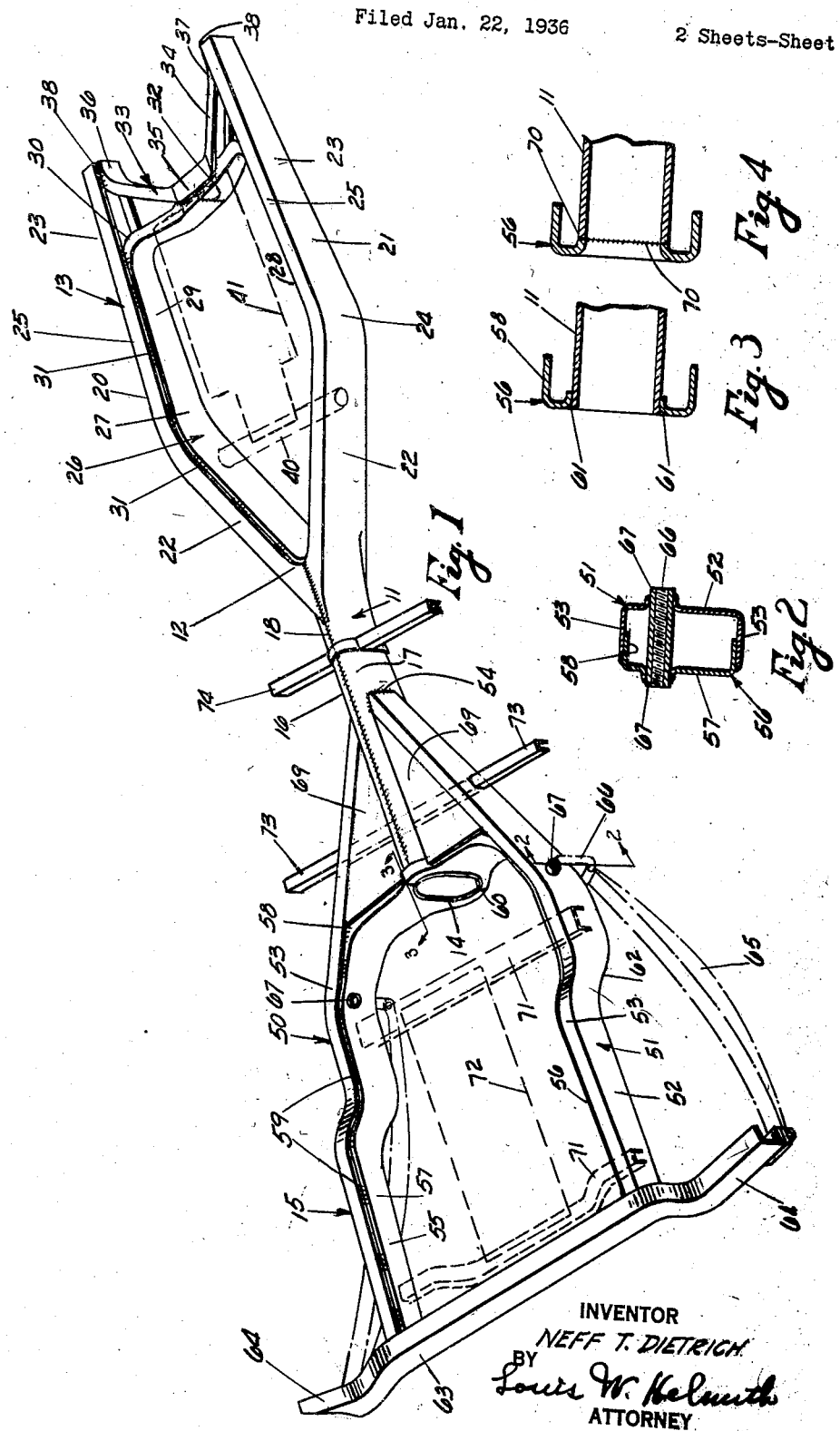

2,113,399

UNITED STATES PATENT OFFICE 2,113,399

AUTOMOBILE FRAME

Neff T. Dietrich, Detroit, Mich., assignor to The Midland Steel Products Company, Cleveland, Ohio, a corporation of Ohio Application January 22, 1936, Serial No. 60,282

6 Claims. (Cl. 280—106)

This invention relates to new and useful improvements in vehicle frames and an important object of the invention is to provide a new type of automotive frame which effects considerable savings in material and labor while adding strength and rigidity to the frames.

Another important object of the invention is to provide a frame of substantially X-shape wherein side rails of conventional frames which usually extend in parallel relation throughout the length of the vehicle frame, are eliminated.

A further important object of the invention is to provide a vehicle frame having a mid-section of high torsional resistance.

Another important object of the invention is to increase the strength of a center tube section of the frame by joining the rear side rail sections to the center tube section intermediate the ends thereof.

Another important object of the invention is to provide a vehicle frame having its longitudinally extending frame members of closed section throughout the length of the vehicle frame.

A further object of the invention is to increase the torsional strength of X-form or K-shape front transverse members.

Other objects and advantages of the invention will become apparent during the course of the following description.

In the accompanying drawings forming a part of this application and wherein like numerals are employed to designate like parts throughout the several views, Fig. 1 is a perspective view of the improved vehicle frame, Fig. 2 is a transverse sectional view taken on the line 2—2 of Fig. 1, Fig. 3 is a transverse sectional view taken on the line 3—3 of Fig. 1, Fig. 4 is a view similar to Fig 3 but showing a different method of welding the rear end of the center tube to a portion of the rear end section of the frame, Fig. 5 is a side elevational view of the improved frame.

Fig. 6 is a transverse sectional view showing a modified form of closed box section.

Fig. 7 is a transverse sectional view showing a modified configuration of the center tube section.

Fig. 8 is a fragmentary plan view of a modified form of frame wherein the midsection and end section are constructed from a single seam tube, and Fig. 9 is a vertical sectional view taken on the line 9—9 of Fig. 8.

The frame illustrated in the drawings is of substantial X-shape configuration throughout its length and comprises a center tubular member 11, herein shown of substantially oval cross section, terminating at its front end 12 in a front end section 13, and at its rear end 14 in a rear end section 15. The tubular member 11 accommodates the drive shaft of an automobile and is herein shown made up of two sections 16 and 17 welded together at 18, but it is obvious that single seam or seamless tubing may be employed as illustrated in Fig. 8.

The front end section 13 is of substantial fork shape and is composed of channel-shaped outer rails 20 and 21 herein shown respectively as being integral extensions of the center sections 16 and 17 forming the tubular member 11, and extending from the forward end 12 thereof in forwardly diverging relation as shown at 22 and then in parallel relation as indicated at 23 to the extreme front end of the frame. Each of the outer side rails 20 and 21 has a web portion 24 and flanges 25 which face inwardly of the frame.

In order to form the outer side rails 20 and 21 into closed box section, a single piece channel-shaped member 26 is provided and comprises side rails 27 and 28 complemental respectively to the side rails 20 and 21 and having a web portion 29 and outwardly facing flanges 30 which are nested within the inwardly facing flanges 25 of the side rails 20 and 21. The inner or sub side rails 27 and 28 are welded or fastened in any other suitable manner to the outer side rails 20 and 21 at spaced intervals as indicated at 31. The front ends of the sub side rails 27 and 28 are bent inwardly of the outer side rails 20 and 21 and are butt or flash welded together as indicated at 32.

The forward extremities of the outer side rails 20 and 21 are connected together by a transversely extending front cross member indicated in general by the numeral 33. This front cross member is of substantial X or K formation and is composed of a channel-shaped member 34 having a medial portion 35 from which extends forwardly diverging arms 36 and 37 having the flanges at their ends nested within the flanges of the outer side rails 20 and 21 whereby they may be welded together as shown at 38. The medial portion 35 is nested about the front ends of the inner side rails 27 and 28 adjacent where they are joined and are welded thereto to complete the front cross member 33 into the X or K configuration shown in Fig. 1, having a box section medial portion.

Connecting the two diverging arms of the front end section is a transversely extending cross member 40 preferably of tubular section having its ends extending completely through the spaced web portions of the side rails 20 and 21 and of the sub side rails 27 and 28, whereby the cross member 40 may be welded to the inner and outer web portions of the side rails. Upon this cross member may be mounted the rear portion of a motor or motor support 41, the forward end of which is carried by the front cross member 33.

The rear end section 15 is also of substantial fork shape and is composed of channel-shaped outer side rails 50 and 51 having web portions 52 and flanges 53 extending inwardly of the frame. The inner ends of the side rails 50 and 51 extend into openings in the tubular member 11 and are welded intermediate the ends thereof as indicated at 54, and extend rearwardly therefrom in diverging relation and then in parallel relation to the rearmost end of the frame.

By connecting the inner ends of the side rails 50 and 51, to the tubular member 11 intermediate the ends thereof as shown at 54, the torsional stresses on the tubular member 11 are reduced and transmitted throughout the frame to thereby eliminate localized torsional stresses in the tubular member 11.

The side rails 50 and 51 are respectively formed in closed box section by means of channel-shaped inner sub rails 55 and 56 complemental respectively to the outer side rails 50 and 51 and having web portions 57 and outwardly facing flanges 58 nested within the inwardly facing flanges of the outer side rails 50 and 51 from the extreme ends thereof to a point opposite the rear of the tubular member 11. The sub side rails 55 and 56 are welded or otherwise secured to the outer side rails 50 and 51 at spaced intervals as shown at 59. The front ends of the sub side rails 55 and 56 are bent inwardly of the side rails 50 and 51 and are provided with openings to respectively embrace the sections 16 and 17, of the tubular member 11, whereby the ends of the sub side rails 55 and 56 may be welded together as shown at 60 and also welded to the tubular member 11 as indicated at 61 in Fig. 3.

A modified method of welding the sub side rails 55 and 56 to the tubular member 11 is shown in Fig. 4 wherein the inner extreme ends of the sub side rails 55 and 56 are formed to be butt or flash welded to the extreme end of the tubular member 11 as indicated at 70.

The side rails of the rear end section 15 are arched upwardly as at 62 to provide the so-called "kickups" to provide clearance for the rear axle. The extreme rear ends of the side rails are connected in spaced relation by a rearmost transverse member 63 of tubular or channel cross-section which is provided with longitudinally offset ends 64 adapted to accommodate the rear ends of the rear spring hangers for springs 65. The forward ends of the rear springs 65 are carried by spring hangers 66 journaled in bushings 67 which extend transversely through and are welded to the spaced web portions of the side rails as shown in Fig. 2.

Connecting the two side rails of the rear section 15 are transversely extending cross members 71 of channel or tubular section having ends extending completely through the inner and outer web portions of the side members and are welded thereto. A motor or motor support 72 may be mounted on the cross members 71 if the frame is employed in a rear engine drive vehicle. Outrigger bars 73 extend through the side rails 50 and 51 and are welded to the tubular member 11 and to the side rails 50 and 51. Another outrigger bar 74 embraces the tubular member 11 and is welded thereto. If the frame is employed in a rear engine drive vehicle, the outrigger bars 73 and 74 can extend completely through the tubular member 11 and be welded thereto.

To add additional rigidity to the frame, upper and lower triangular gusset plates 69 are disposed between the tubular member 11, the inner inturned ends of the sub side rails 55 and 56 and the flanges of the side rails 50 and 51, whereby they may be welded thereto to form the intersection of these parts into box-section. If desired the gusset plates 69 may be integral with the flanges of the side rails 50 and 51.

In Fig. 6 a slight modification of forming the side rails into box-section is illustrated, wherein the flanges of the channel-shaped main side rail 75 and sub-side rail 76 extend in the same direction to form a closed box section with the flanges spot or otherwise welded or secured together.

Fig. 7 illustrates a modification in the contour of the tubular center member 11 and discloses longitudinally extending pressed out ribs 77 to strengthen the tubular member 11 and to provide an irregular surface to facilitate attachment of outrigger bars if the latter are made to embrace the tubular member. The ribs 77 also increase the welding area at the point where the side rails 50 and 51 are welded to the tubular member 11.

Fig. 8 discloses substantially one half of a frame, and since the remaining portion of the frame may be constructed in a similar manner it is not shown or described. This frame is constructed from a tubular member herein shown having a single seam, split at one end longitudinally therealong and separated to provide outer side rails 80 and 81 and a tubular mid-section 82. The outer side rails are formed into channel sections and the welded seam 83, forming the single seam in the tubular member is disposed in the web portion of the outer side rail 80.

The end section is formed into a closed box section by means of a single substantially U-shaped member 85 of channel configuration having its side arms 86 and 87 nested respectively within the flanges of the outer side rails 80 and 81, and are welded thereto or otherwise suitably connected. Outrigger bars 90 of channel configuration have one end section 92 extending through the web portions of the side rails, and have laterally offset portions 93 nested within the flanges of the side rails and the opposite end sections 94 are welded together, as indicated at 95 and abut the flanges of the U-shaped member 85. These outrigger bars are connected to the side rails and U-shaped member by welding or other suitable means. To complete the box section throughout the end section, channel shaped members 96 are nested within the flanges of the side rails 80 and 81 and are welded or otherwise fastened thereto.

It will be understood that various changes in the size, shape and arrangement of parts may be resorted to without departing from the spirit of the invention or the scope of the appended claims.

I claim:

1. In an automobile frame, a central longitudinally disposed tubular member, a pair of outer side members extending integrally in diverging relation from one end of said tubular member to one end of said frame, inner side members complementary to said outer side members secured thereto to form a portion of said frame into closed box section, a pair of inner side members secured to the opposite end of said tubular member and extending to the opposite end of said frame, and outer side members secured to said tubular members intermediate the ends thereof and extending complementary to said second mentioned inner side members to form another portion of said frame into closed box-section.

2. In an automobile frame, a longitudinally disposed tubular member, diverging side members of closed box section connected to one end of said tubular member and extending to one end of said frame and provided with aligned apertures in the web portions thereof, a cross member having its opposite ends disposed in the openings of said box-section side members and secured to the webs thereof and to said tubular member, and diverging side members extending from the opposite end of said tubular member to the opposite end of said frame.

3. In an automobile frame, a longitudinally disposed tubular member, a pair of side members of closed box-section diverging from one end of said tubular member to one end of said frame, a pair of side members diverging from the opposite end of said tubular member to the other end of said frame, members complementary to said second mentioned side members to form a closed box section side rail, said complementary members extending to and being secured to said tubular member intermediate the ends thereof.

4. A vehicle frame constituted solely by a frame of substantially X-shaped configuration and comprising a tubular member; a pair of diverging side members extending integrally from one end of said tubular member to one end of said frame; and another pair of diverging side members welded to said tubular member at a point spaced from the opposite end of said tubular member and extending therefrom to the other end of said frame.

5. A vehicle frame constituted solely by a frame of substantial X-shaped configuration and comprising; an elongated tubular member; diverging side members of closed box-section extending from one end of said elongated tubular member to one end of said frame; and diverging side members of closed box-section extending from the opposite end of said tubular member to the other end of said frame, a portion of said latter diverging members extending to and secured to said tubular member intermediate the ends thereof.

6. In an automobile frame, a centrally disposed tubular member, a pair of side rails extending in diverging relation from one end of said tubular member, and a pair of box section side rails comprising inner and outer members, the inner member terminating and secured to the opposite end of said tubular member, and the other member having a terminal portion extending beyond and spaced from the said secured end of said inner member to a point intermediate the ends of said tubular member and secured thereto at said point.

NEFF T. DIETRICH.